United States Patent
Kwon et al.

(10) Patent No.: US 8,331,472 B2
(45) Date of Patent: Dec. 11, 2012

(54) METHOD AND APPARATUS FOR TRANSMITTING/RECEIVING DATA IN AN ORTHOGONAL FREQUENCY DIVISION MULTIPLE ACCESS SYSTEM

(75) Inventors: Hwan-Joon Kwon, Suwon-si (KR); Jae-Chon Yu, Suwon-si (KR); Jin-Kyu Han, Seoul (KR); Dong-Hee Kim, Yongin-si (KR); Yeon-Ju Lim, Seoul (KR); Seung-Kyun Oh, Suwon-si (KR)

(73) Assignee: Samsung Electronics, Ltd (KR)

( * ) Notice: Subject to any disclaimer, the term of this patent is extended or adjusted under 35 U.S.C. 154(b) by 1138 days.

(21) Appl. No.: 11/942,281

(22) Filed: Nov. 19, 2007

(65) Prior Publication Data

US 2008/0123766 A1  May 29, 2008

(30) Foreign Application Priority Data

Nov. 17, 2006  (KR) .................. 10-2006-0114156
Nov. 28, 2006  (KR) .................. 10-2006-0118601

(51) Int. Cl.
    *H04B 7/02* (2006.01)
(52) U.S. Cl. ........ 375/267; 375/260; 375/259; 375/295; 375/316; 375/219
(58) Field of Classification Search .................. 375/267, 375/260, 259, 295, 316, 219
    See application file for complete search history.

(56) References Cited

U.S. PATENT DOCUMENTS

| | | | |
|---|---|---|---|
| 6,819,930 B1 | 11/2004 | Laroia et al. | |
| 2009/0303938 A1* | 12/2009 | Kim et al. | 370/329 |

FOREIGN PATENT DOCUMENTS

| | | |
|---|---|---|
| KR | 1020050000709 | 1/2005 |
| KR | 1020050089699 | 9/2005 |
| KR | 1020050091578 | 9/2005 |

OTHER PUBLICATIONS

Hyung G. Myung et al., "Single Carrier FDMA for Uplink Wireless Transmission", Polytechnic University, IEEE Vehicular Technology Magazine, Sep. 2006.
Huawei, EUTRA Downlink Multiplexing of Localized and Distributed Channels, 3 GPP TSG RAN WG1, London, UK. Aug. 29-Sep. 2, 2005.
Junsung Lim et al., "Channel-Dependent Scheduling of Uplink Single Carrier FDMA Systems", Dept. of Electrical Engineering, Polytechnic University, 2006.
Motorola, EUTRA SC-FDMA Uplink Resource Block, Resource Allocation and Pilot/Reference Signal Design & TP, 3GPP TSG RAN1 LTE Ad Hoc, Helsinki, Finland, Jan. 23-Jan. 25, 2006.
Hassan Yaghobbi, Scalable OFDMA Physical Layer in IEEE 802.16 Wirelessman, Intel Technology Journal, vol. 8, Issue 3, 2004.

* cited by examiner

*Primary Examiner* — Zewdu Kassa
(74) *Attorney, Agent, or Firm* — The Farrell Law Firm, P.C.

(57) ABSTRACT

A method for transmitting data in an Orthogonal Frequency Division Multiple Access (OFDMA) system. The data transmission method includes determining a number of diversity tiles, each of which includes physically separated frequency resources; dividing an entire system band into diversity subbands including the diversity tiles and localized subbands including localized tiles, each of which includes physically adjacent frequency resources, when the determined number of diversity tiles is greater than a threshold; uniformly distributing the diversity tiles over the entire system band, and disposing the localized tiles in the remaining bands except for the diversity tiles, when the determined number of diversity tiles is not greater than the threshold; and transmitting data to multiple terminals over the configured diversity tiles and localized tiles using diversity transmission and localized transmission schemes.

25 Claims, 16 Drawing Sheets

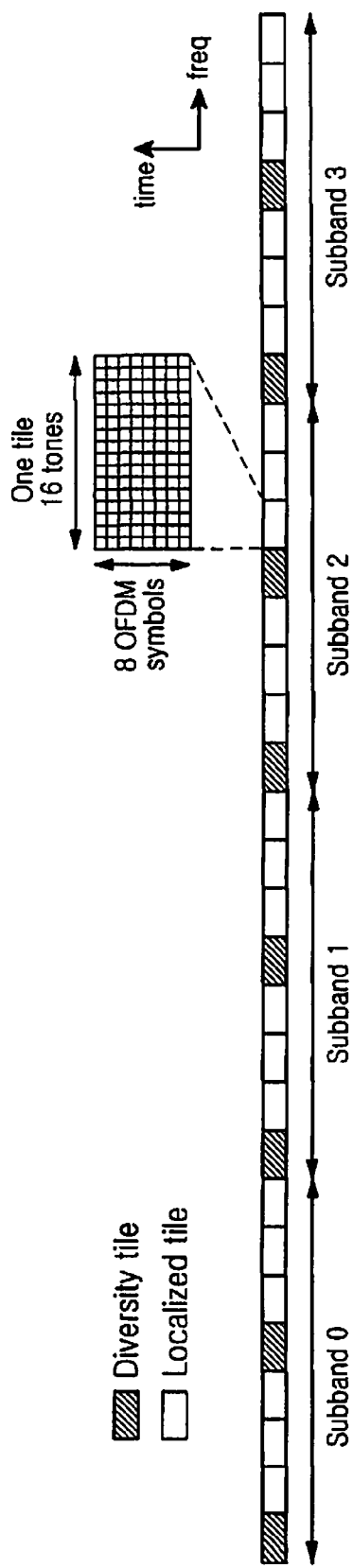
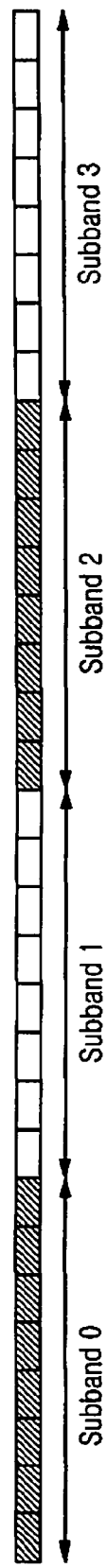
FIG. 8A
Tile based multiplexing: the number of Diversity tiles is equal to or less than a half of the total number of useful tiles in the system.
FIG. 8B
Sub-band based multiplexing: the number of Diversity tiles is larger than a half of the total number of useful tiles in the system.

METHOD AND APPARATUS FOR TRANSMITTING/RECEIVING DATA IN AN ORTHOGONAL FREQUENCY DIVISION MULTIPLE ACCESS SYSTEM

PRIORITY

This application claims priority under 35 U.S.C. §119(a) to a Korean Patent Application filed in the Korean Intellectual Property Office on Nov. 17, 2006 and assigned Serial No. 2006-114156, and a Korean Patent Application filed in the Korean Intellectual Property Office on Nov. 28, 2006 and assigned Serial No. 2006-118601, the disclosures of each of which are incorporated herein by reference.

BACKGROUND OF THE INVENTION

1. Field of the Invention

The present invention generally relates to a method and apparatus for transmitting/receiving data in a mobile communication system, and in particular, to a method for efficiently multiplexing diversity transmission and localized transmission in an Orthogonal Frequency Division Multiple Access (OFDMA) system, and a transmission/reception apparatus thereof.

2. Description of the Related Art

Generally, wireless communication systems have been configured for a stationary wired network which cannot be connected to terminals. A typical wireless communication system can include, for example, Wireless Local Area Network (WLAN), Wireless Broadband (Wibro), Mobile Ad Hoc, etc., all of which are referred to herein as a mobile communication system.

A mobile communication system, unlike a general wireless communication system, is premised on mobility of a user. A mobile communication system is ultimately aimed at allowing a user to exchange information media with anyone at anytime in anyplace using a mobile terminal, such as a portable phone, Personal Digital Assistant (PDA), a radio pager, etc. In addition, with rapid development of communication technology, mobile communication systems have reached a phase of providing not only general voice call service but also high-speed data service capable of transmitting high-volume digital data, such as moving images as well as email (electronic mail), still images, etc., by means of a mobile terminal.

For example, an Orthogonal Frequency Division Multiplexing (OFDM) system is a typical example of a mobile communication system that provides high-speed data service using a multi-carrier transmission scheme. An OFDM transmission scheme, a scheme for converting a serial input symbol stream into parallel signals and modulating each of them with multiple orthogonal subcarriers before transmission, has attracted public attention with the development of Very Large Scale Integration (VLSI) technology since the early 1990s.

An OFDM transmission scheme typically modulates data using multiple subcarriers. As subcarriers maintain their mutual orthogonality, an OFDM transmission scheme, compared to an existing single-carrier transmission scheme (or single-carrier modulation scheme), has a characteristic that the OFDM transmission scheme is robust against a frequency selective multipath fading channel. Therefore, an OFDM transmission scheme is a transmission scheme suitable for a high-speed packet data service, such as a broadcasting service or the like. Orthogonal Frequency Multiple Access (OFDMA), a modification of OFDM, is a technology for realizing multiple access by providing some of the available subcarriers to each user.

In a common OFDMA system, a resource allocation scheme for data transmission can be classified into diversity transmission and localized transmission according to the physical pattern of the allocated resources.

Diversity transmission, as used herein, refers to a way of transmitting data over physically distributed (or physically separated) resources, and localized transmission, as used herein, refers to a way of transmitting data over physically localized (or physically adjacent) resources.

FIG. 1 illustrates diversity transmission, localized transmission, and combined transmission of the two other transmission methods in a conventional OFDMA system.

Referring to FIG. 1, the horizontal axis indicates the frequency domain, and the vertical axis indicates the time domain. The smallest square indicates one subcarrier in the frequency domain, and indicates one OFDM symbol in the time domain. Reference numeral 101 indicates one tile, and in reference numeral 101 of FIG. 1, the tile is composed of 16 adjacent subcarriers in the frequency domain and 8 adjacent OFDM symbols in the time domain.

Commonly, one OFDM symbol is composed of multiple subcarriers, and when the OFDM symbol has the tile structure, multiple tiles are formed in the frequency domain. In the system of FIG. 1, one OFDM symbol is composed of 512 subcarriers, so there are 32 tiles in the frequency domain (512=16×32).

Reference numeral 102 indicates indexes for the tiles stated above. That is, there are tile #1 to tile #32. In FIG. 1, a part shown by the same hatching indicates data symbols being transmitted to one user. For example, a tile #1 is fully indicated by hatching of reference numeral 110, and this means that resources corresponding to the tile #1, i.e. resources of '8 OFDM symbols'×'16 subcarriers' corresponding to the tile #1, carry the data symbols being transmitted to one user. The way of transmitting data over the adjacent resources is herein called localized transmission. In the foregoing case where one tile transmits data for one user, the tile will be referred to herein as a localized transmission-dedicated tile 103, a localized tx tile, or a localized tile, for convenience.

In FIG. 1, data is transmitted to one user over the tile #1 105, data is transmitted to another user over the tile #3 106, and data is transmitted to further another user over the tile #30 108 and the tile #31 109. In this manner, multiple tiles can be used for transmitting one user data, and the multiple tiles can be either physically adjacent tiles, like the tile #30 108 and the tile #31 109, shown in FIG. 1, or physically separated tiles. When one tile is entirely used for transmitting data to one user in this way, this tile is referred to herein as a localized tile. The localized transmission scheme is a transmission scheme favored when a transmitter selects a frequency having a better channel response in the frequency domain and transmits data using the selected frequency, e.g., when a moving velocity of a user is low and the transmitter performs scheduling depending on Channel Quality Information (CQI) received from the user.

It can be appreciated in FIG. 1 that data symbols for three users are distributed in the tile #2 120, the tile #4 122 and the tile #32 124. For example, as to data transmission for the user corresponding to the part shown by hatching of reference numeral 112, data symbols for the user are uniformly distributed in the tile #2 120, the tile #4 122, and the tile #32 124. This transmission is referred to herein as diversity transmission, and the diversity transmission scheme is a transmission scheme commonly favored when a transmitter has difficulty in selecting a good channel environment in the frequency domain for transmission, i.e., favored for the case where due to the very high moving velocity of the user, even though the transmitter receives channel quality information from the mobile terminal, reliability of the channel quality information is too low at the actual data transmission time because the channel has already been changed, so the transmitter cannot depend on the received channel quality information.

The diversity transmission transmits data symbols over multiple tiles, and in this case, the multiple tiles are referred to herein as diversity transmission-dedicated tiles 104, diversity Tx tiles, or diversity tiles, for convenience.

Therefore, in FIG. 1, the tile #2 120, the tile #4 122 and the tile #32 124 are diversity transmission-dedicated tiles.

As described above, an OFDMA communication system should simultaneously support users having a high moving velocity and users having a low moving velocity. To this end, a need exists for a method of efficiently configuring and managing the diversity transmission-dedicated tiles 104 and the localized transmission-dedicated tiles 103.

SUMMARY OF THE INVENTION

The present invention addresses at least the above-described problems and/or disadvantages and provides at least the advantages described below. Accordingly, an aspect of the present invention is to provide a multiplexing method and apparatus for simultaneously supporting a user having a high moving velocity and a user having a low moving velocity in an OFDMA communication system.

Another aspect of the present invention is to provide a method and apparatus for multiplexing diversity transmission-dedicated tiles and localized transmission-dedicated tiles in an OFDMA system.

Another aspect of the present invention is to provide a method for configuring and managing efficient frequency reuse subbands to support both the technology of multiplexing diversity transmission-dedicated tiles and localized tiles and the frequency reuse technology in an OFDMA system.

Another aspect of the present invention is to provide a method for configuring efficient frequency reuse subbands for localized zones in an OFDMA system, and a resource allocation method therefor.

According to one aspect of the present invention, there is provided a method for transmitting data in an OFDMA system. The data transmission method includes determining a number of diversity tiles, each of which includes physically separated frequency resources; dividing an entire system band into diversity subbands including the diversity tiles and localized subbands including localized tiles, each of which includes physically adjacent frequency resources when the determined number of diversity tiles is greater than a threshold; uniformly distributing the diversity tiles over an entire system band, and disposing the localized tiles in remaining bands except for the diversity tiles when the determined number of diversity tiles is not greater than the threshold; and transmitting data to multiple terminals over the configured diversity tiles and localized tiles using diversity transmission and localized transmission schemes.

According to another aspect of the present invention, there is provided a method for receiving data in an OFDMA system. The data reception method includes acquiring a number of diversity tiles, each of which includes physically separated frequency resources, over a specific control channel; determining whether the acquired number of diversity tiles is greater than a threshold; dividing an entire system band into diversity subbands including the diversity tiles and localized subbands including localized tiles, each of which includes physically adjacent frequency resources, when the acquired number of diversity tiles is greater than the threshold; dividing the entire system band into diversity tiles uniformly distributed over the entire system band and localized tiles disposed in remaining bands except for the diversity tiles when the number of diversity tiles is not greater than the threshold; and receiving data over allocated tiles among the diversity tiles and the localized tiles.

According to further another aspect of the present invention, there is provided a transmission apparatus of a base station for transmitting data in an OFDMA system. The transmission apparatus includes a scheduler for determining a number of diversity tiles, each of which includes physically separated frequency resources to be used in an entire system band; a controller for comparing the determined number of diversity tiles with a threshold, dividing the entire system band into diversity subbands including the diversity tiles and localized subbands including localized tiles, each of which includes physically adjacent frequency resources when the number of diversity tiles is greater than the threshold, and uniformly distributing the diversity tiles over the entire system band, and disposing the localized tiles in the remaining bands except for the diversity tiles when the number of diversity tiles is not greater than the threshold; and a transmission module for transmitting data to multiple terminals over the diversity tiles and localized tiles configured under control of the controller.

According to yet another aspect of the present invention, there is provided a reception apparatus for receiving data in an OFDMA system. The reception apparatus includes a control channel receiver for acquiring a number of diversity tiles, each of which includes physically separated frequency resources, from a base station over a specific control channel; a controller for comparing the acquired number of diversity tiles with a threshold, dividing an entire system band into diversity subbands including the diversity tiles and localized subbands including localized tiles, each of which includes physically adjacent frequency resources when the number of diversity tiles is greater than the threshold, and dividing the entire system band into diversity tiles uniformly distributed over the entire system band and localized tiles disposed in the remaining bands except for the diversity tiles when the number of diversity tiles is not greater than the threshold; and a reception module for receiving data over allocated tiles among the diversity tiles and the localized tiles configured under control of the controller.

BRIEF DESCRIPTION OF THE DRAWINGS

The above and other aspects, features and advantages of the present invention will become more apparent from the following detailed description when taken in conjunction with the accompanying drawings in which:

FIGS. 8A and 8B illustrate another method for configuring diversity tiles and Localized tiles according to the first embodiment of the present invention;

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

In a multiplexing method of diversity transmission-dedicated tiles and localized transmission-dedicated tiles, provided by a first embodiment of the present invention, a base station determines the number of diversity transmission-dedicated tiles and the number of localized transmission-dedicated tiles at particular intervals through a specific resource allocation procedure, signals the determined numbers of tiles to terminals, and determines physical positions of the determined diversity transmission-dedicated tiles and localized transmission-dedicated tiles. In this process, if the number of diversity transmission-dedicated tiles does not exceed a particular threshold, the base station determines physical positions of the diversity transmission-dedicated tiles such that the diversity transmission-dedicated tiles are uniformly distributed over the entire system band, and determines physical positions of the localized transmission-dedicated tiles such that the localized transmission-dedicated tiles are located in the remaining positions where the diversity transmission-dedicated tiles are not located in the entire system band. The multiplexed diversity transmission-dedicated tiles and localized transmission-dedicated tiles undergo cyclic shift on a tile-by-tile basis as time goes by. However, if the number of diversity transmission-dedicated tiles exceeds the threshold, the base station determines physical positions of the tiles such that the diversity transmission-dedicated tiles and the localized transmission-dedicated tiles are located in different subbands. The multiplexed subbands undergo cyclic shift on a subband-by-subband basis within a Hybrid Automatic Repeat reQuest (HARQ) Round Trip Time.

A detailed description of the foregoing method will now be made with reference to the accompanying drawings.

Figure 1:
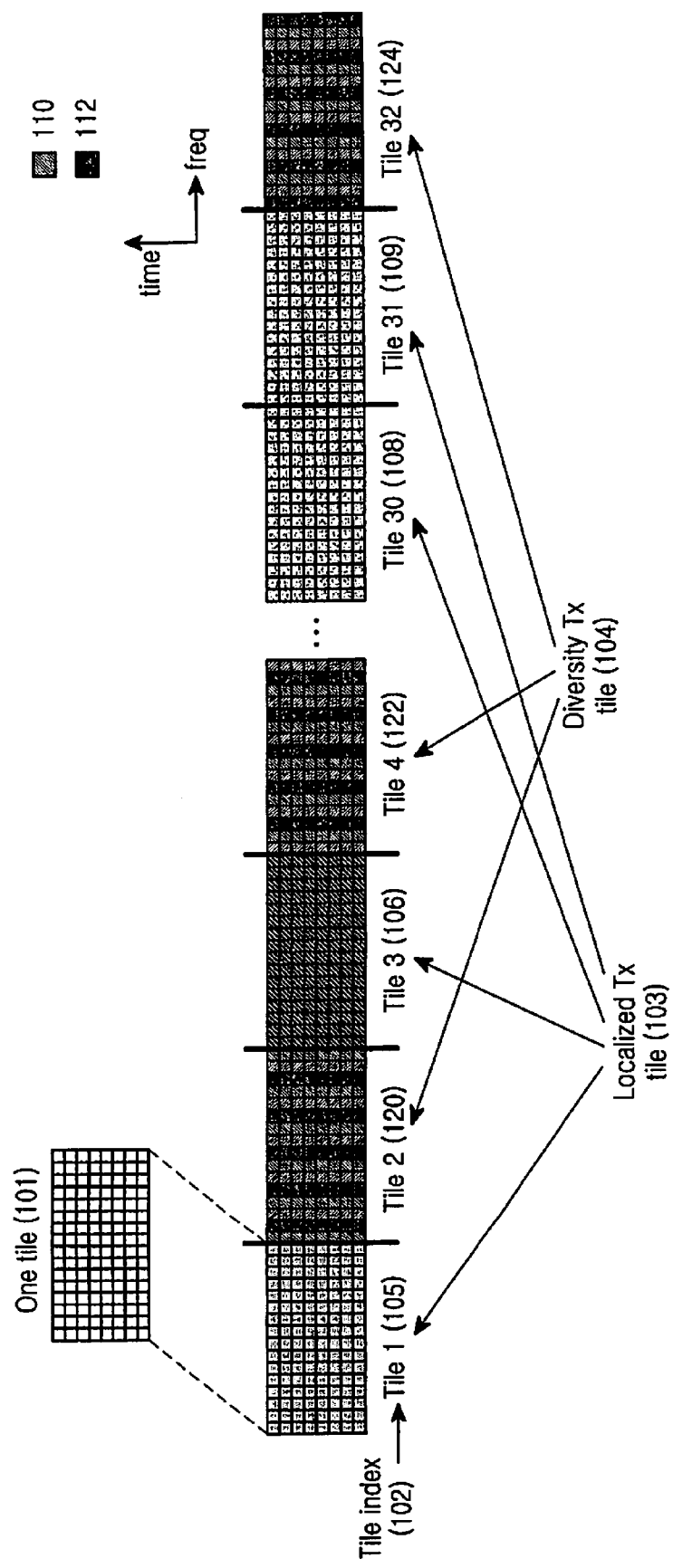
FIG. 1 illustrates diversity transmission, localized transmission, and combined transmission of the two other transmission methods in a general OFDMA system.
Figure 2:
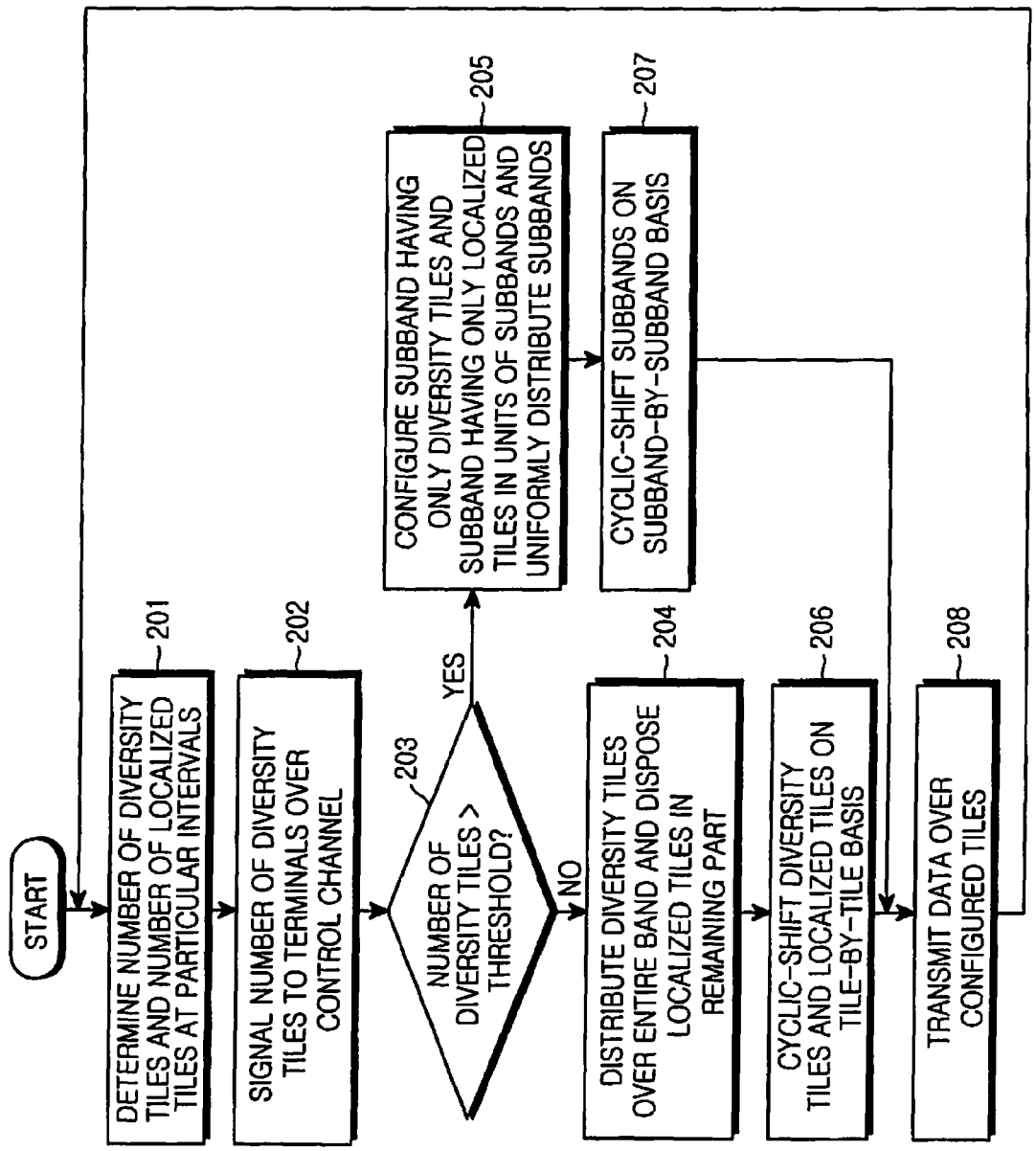
FIG. 2 illustrates an operation of a base station according to a first embodiment of the present invention.

FIG. 2 shows an operation of a base station according to a first embodiment of the present invention.

Referring to FIG. 2, a base station determines in step 201 the number of diversity tiles and the number of localized tiles at particular intervals through a specific resource allocation procedure. In step 202, the base station broadcasts the number of diversity tiles and the number of localized tiles, determined in step 201, to terminals in the system over a particular control channel. The operation broadcasting in step 202 refers to an operation of transmitting the information such that all users in one cell can receive the information over an arbitrary common channel, rather than transmitting the information only to a particular user. In step 202, if all terminals already know the total number of tiles, the base station can provide information only on the number of diversity tiles, or only on the number of localized tiles. This is because the terminal can know another one of the numbers of tiles when the terminal knows any one of the numbers of tiles. The base station is assumed to provide information on the number of diversity tiles to the terminals in FIG. 2.

The base station determines in step 203 whether the number of diversity tiles, determined in step 201, exceeds a particular threshold. Preferably, the threshold is 25%~50% of the total number of tiles. If the number of diversity tiles is determined to not exceed the threshold in step 203, the base station distributes the diversity tiles over the entire band in step 204. A uniform distribution method can be used as the distribution method.

Figure 3:
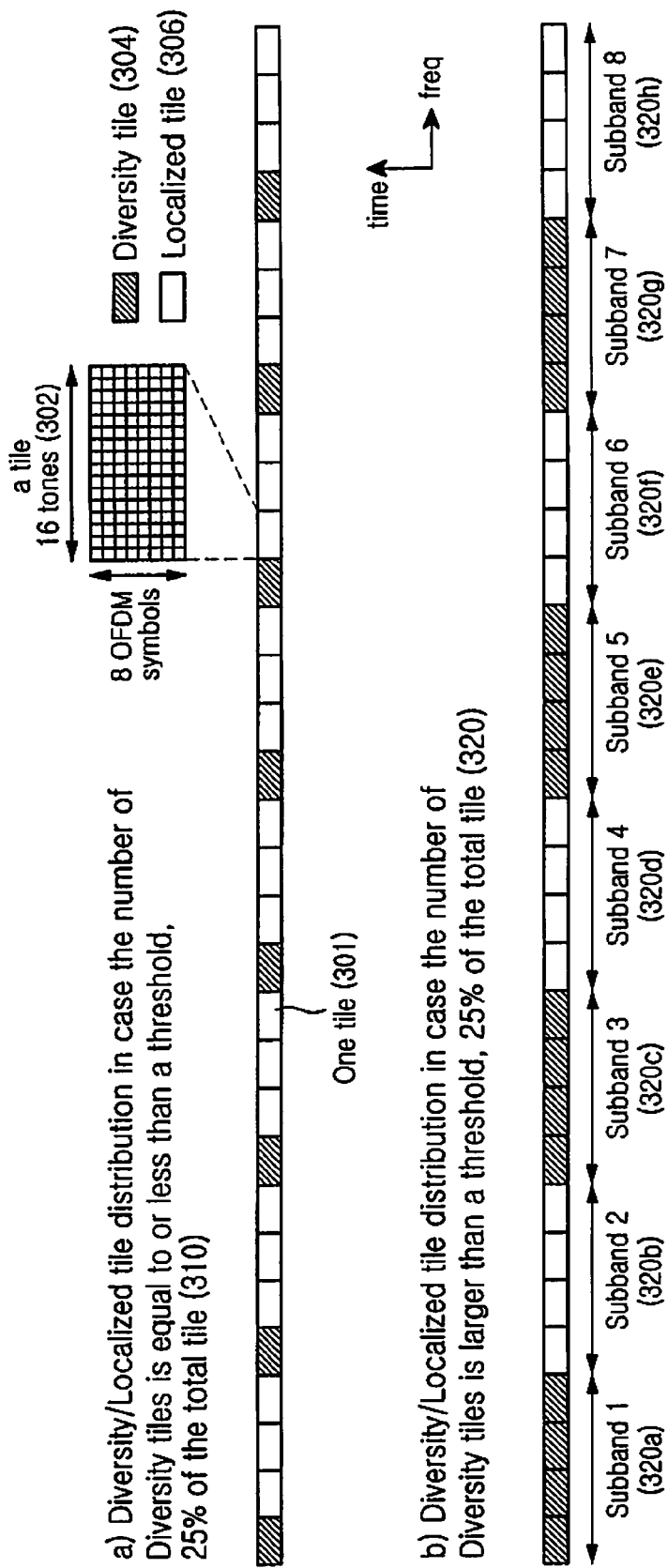
FIG. 3 illustrates position examples of diversity tiles and localized tiles when the threshold used in step 203 of FIG. 2 is 25% in the first embodiment of the present invention.

In FIG. 3, reference numeral 310 shows an exemplary structure of the tiles distributed in step 204 of FIG. 2.

FIG. 3 shows examples of positions of diversity tiles and localized tiles when the threshold used in step 203 of FIG. 2 is 25% in the first embodiment of the present invention. In FIG. 3, one rectangle denoted by reference numeral 301 indicates one tile, and the one tile is composed of 16 adjacent subcarriers in the frequency domain and 8 adjacent Orthogonal Frequency Division Multiplexing (OFDM) symbols in the time domain as shown by reference numeral 302. In FIG. 3, the total number of tiles is 32. In the case denoted by reference numeral 310, the number of tiles used as diversity tiles among the total of 32 tiles is 8, and because the number does not exceed the threshold of 25%, the diversity tiles are uniformly distributed. Once positions of the diversity tiles are determined in this way, positions of the localized tiles are automatically determined.

In step 206, the base station cyclic-shifts the positions of the diversity tiles and the localized tiles distributed in step 204 on a tile-by-tile basis as time passes.

Figure 4:
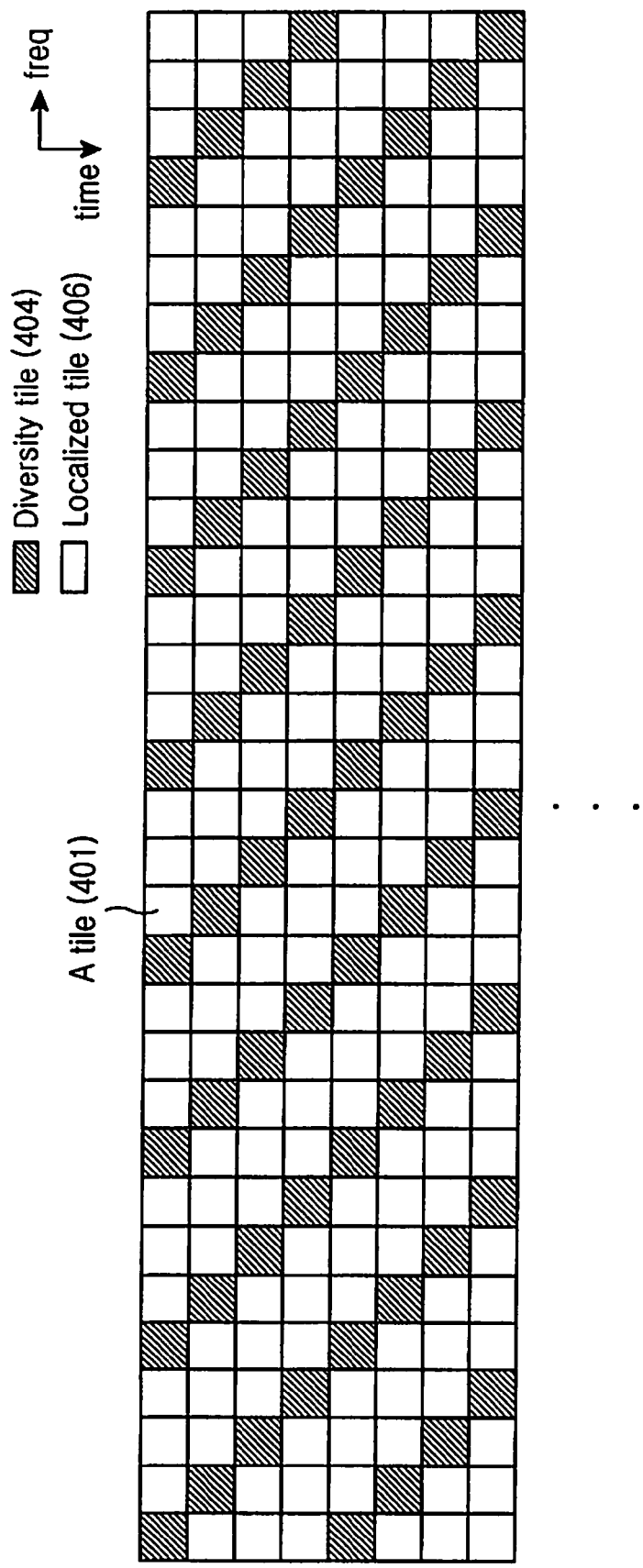
FIG. 4 illustrates the tiles shown by reference numeral 310 of FIG. 3, which undergo cyclic shift on a tile-by-tile basis as time goes by as shown in step 206 of FIG. 2.

FIG. 4 illustrates the tiles shown by reference numeral 310 of FIG. 3, which undergo cyclic shift on a tile-by-tile basis as time goes by as shown in step 206. Referring to FIG. 4, one square denoted by reference numeral 401 indicates one tile. The tile denoted by reference numeral 404 indicates a diversity tile, and the tile denoted by reference numeral 406 indicates a localized tile. The amount of shift is preferably not necessarily one tile. That is, the shift can be performed in units of multiple tiles.

However, if the number of diversity tiles is determined to exceed the threshold in step 203, the base station multiplexes in step 205 the diversity tiles and the localized tiles on a subband-by-subband basis, and uniformly distributes the multiplexed diversity subbands and localized subbands in the entire system band. Subband, as used herein, refers to a band corresponding to N tiles, where N denotes an integer and has a value previously agreed upon between the base station and the terminal. The diversity subband refers to a subband where only the diversity tiles exist, and the localized subband refers to a subband where only the localized tiles exist.

In FIG. 3, reference numeral 320 shows an example of the tiles distributed in step 205 of FIG. 2. In the above case, the number of tiles used as diversity tiles among the total of 32 tiles is 16, and because the number exceeds the threshold of 25%, the diversity tiles and the localized tiles are multiplexed on a subband-by-subband basis as shown by reference numeral 320. In this example, one subband is composed of four adjacent tiles. That is, in FIG. 3, N=4. Therefore, it can be appreciated in FIG. 3 that there are 32 tiles and their associated 8 subbands. Because subband #320$a$, subband #3 320$c$, subband #5 320$e$ and subband #7 320$g$ include only the diversity tiles, they are diversity subbands, and because subband #2 320$b$, subband #4 320$d$, subband #6 320$f$ and subband #8 320$h$ include only the localized tiles, they are localized subbands. That is, as to the reference numeral 320 of FIG. 3, it can be noted that the diversity subbands and the localized subbands are uniformly distributed over the entire system band. The distributed diversity subbands and localized subbands undergo cyclic shift on a subband-by-subband basis as time passes.

Figure 5:
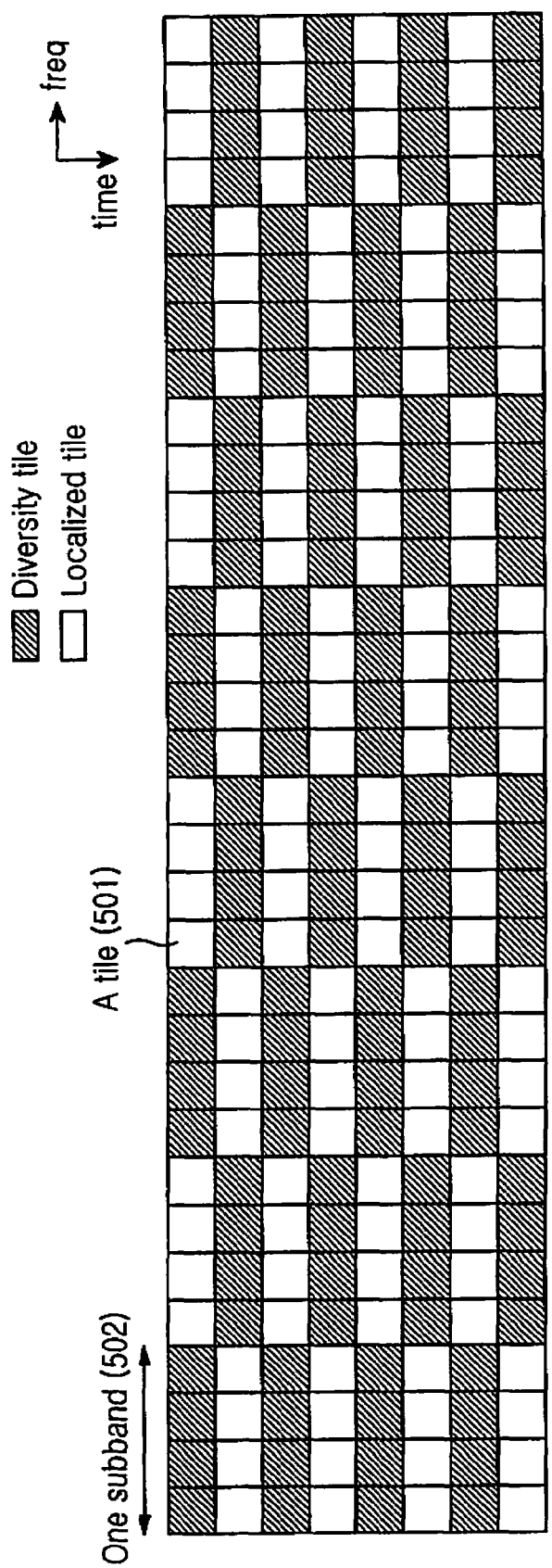
FIG. 5 illustrates an operation example of performing cyclic shift on a subband-by-subband basis in step 207 of FIG. 2.

FIG. 5 shows an operation example of performing cyclic shift on a subband-by-subband basis in step 207 of FIG. 2. Shown in FIG. 5 is a subband-based cyclic shift operation for the diversity subband and localized subbands distributed as shown by reference numeral 320 of FIG. 3.

Figure 6:
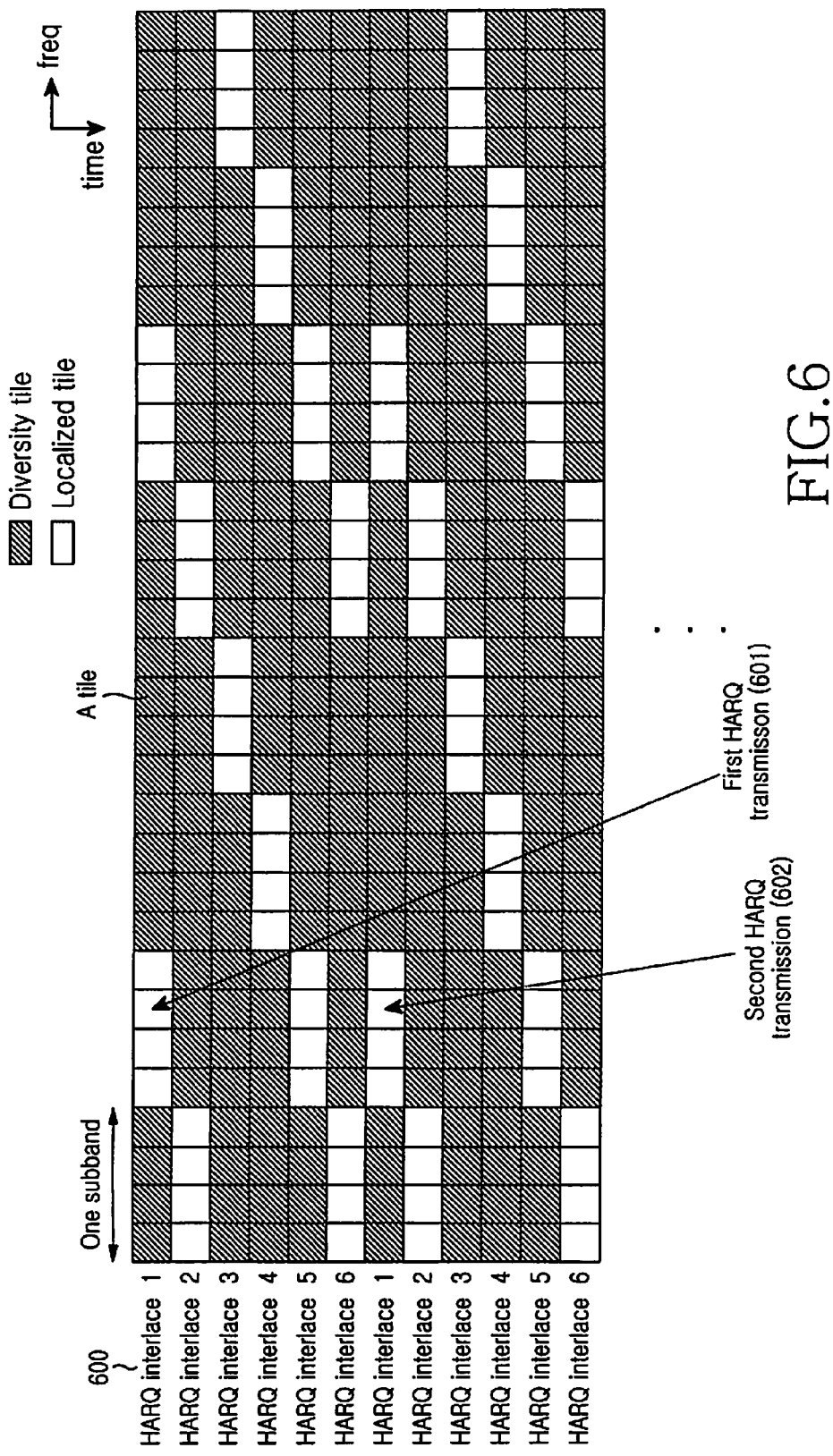
FIG. 6 illustrates another operation example of performing cyclic shift on a subband-by-subband basis in step 207 of FIG. 2.

FIG. 6 shows another operation example of performing cyclic shift on a subband-by-subband basis in step 207 of FIG. 2. Shown in FIG. 6 is a subband-based cyclic shift operation for disposing positions of localized subbands in the same HARQ interlaces. HARQ interlace, as used herein, refers to an interlace where one HARQ process is performed. For example, if the base station transmits data over a particular tile in HARQ interlace #1, a terminal scheduled to receive the data receives the transmitted data and attempts to demodulate the received data. Thereafter, if the terminal feeds back, to the base station, Acknowledgment/Non-Acknowledgment (ACK/NACK) indicating success/failure in the demodulation, the base station performs retransmission in the same HARQ interlace 1 when there is a need for retransmission (i.e. upon receipt of NACK from the terminal). The one interlace where the HARQ operation is performed is referred to as HARQ interlace.

For example, when the base station receives NACK after performing initial transmission over the localized tiles shown by reference numeral 601, the base station performs retransmission over the localized tiles denoted by reference numeral 602. As illustrated, the 4 tiles corresponding to reference numeral 601 and the 4 tiles corresponding to reference numeral 602 are tiles corresponding to the same HARQ interlace #1 600. It can be appreciated in FIG. 6 that for an arbitrary HARQ interlace k (where k denotes an index for HARQ interlace, and k=1, 2, 3, 4, 5 and 6 in FIG. 6), positions of the localized subbands are equal. The reason why the cyclic shift operation is limited to the subband-by-subband operation as shown in FIG. 6 is to allow the initial transmission and the retransmission to have the same frequency band, and this is to ensure that when the base station selects a frequency having a good channel response during initial transmission, a retransmission packet is transmitted over the same subband as that used for initial transmission, even at the retransmission.

In the embodiment of FIG. 6, the cyclic shift is performed on a subband-by-subband basis, and the shift pattern is determined so the cyclic shift has the same frequency band positions both at initial transmission and retransmission, i.e., has the same frequency bands for the same interlace.

After performing cyclic shift on a tile-by-tile or subband-by-subband basis in step 206 or 207, the base station transmits data over the configured tiles in step 208. The process of steps 201 to 208 is repeated at particular intervals.

Figure 7:
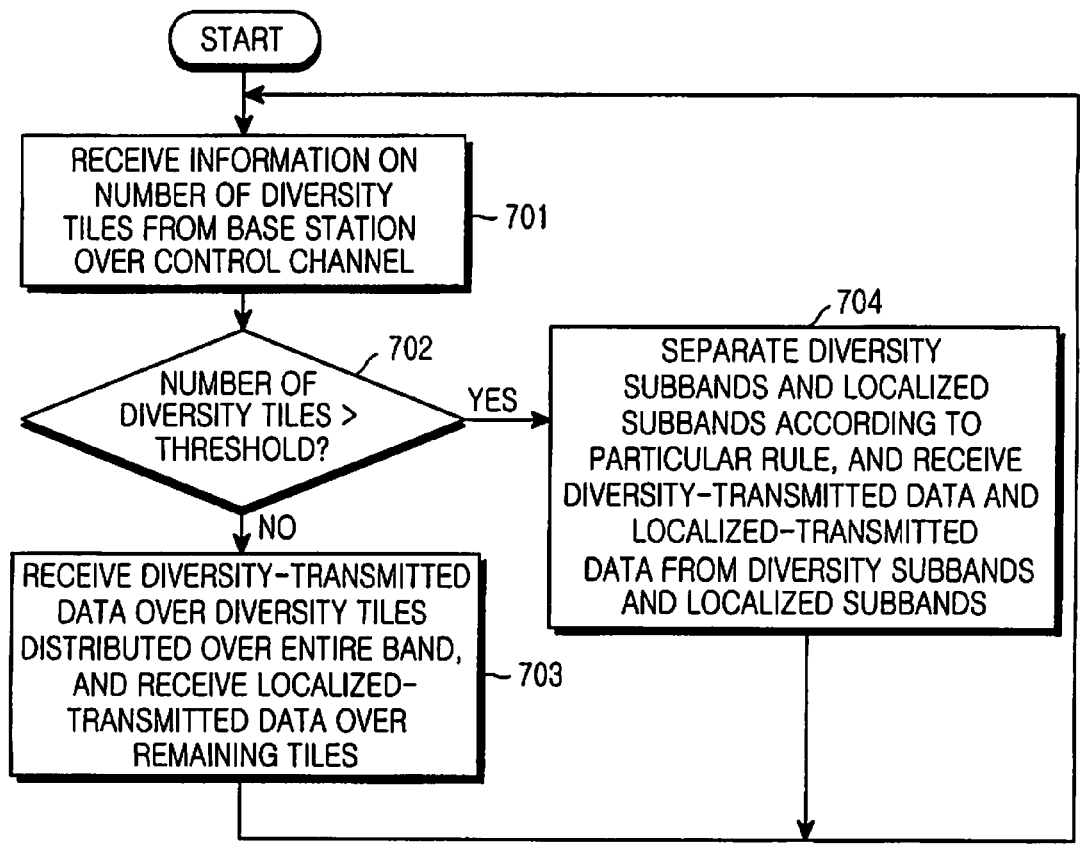
FIG. 7 illustrates an operation of receiving data by a terminal according to the first embodiment of the present invention.

FIG. 7 shows an operation of receiving data by a terminal according to the first embodiment of the present invention. Referring to FIG. 7, a terminal acquires in step 701 information on the number of diversity tiles from a base station over a specific control channel. This information is the information broadcast by the base station in step 202 of FIG. 2. Although the terminal acquires only the number of diversity tiles over the control channel in step 701, the terminal will acquire both the number of diversity tiles and the number of localized tiles when the base station transmits both of them.

Thereafter, the terminal determines in step 702 whether the number of diversity tiles is greater than a particular threshold. If the number of diversity tiles is determined to be not greater than the threshold in step 702, the terminal(s) using the diversity transmission scheme receives, in step 703, data over the diversity tiles distributed over the entire band, and the terminal(s) using the localized transmission scheme receives, in step 703, localized-transmitted data over the remaining tiles, or the localized tiles.

However, if the number of diversity tiles is determined to be greater than the threshold in step 702, the terminal proceeds to step 704 where the terminal separates diversity subbands and localized subbands according to a particular rule, and receives diversity-transmitted data and/or localized-transmitted data from the diversity subbands and/or localized subbands over the allocated tiles. That is, the terminal(s) using the localized transmission receives data over the terminal(s)' allocated localized tiles among the localized tiles included in the localized subbands, and the terminal(s) using the diversity transmission receives data over the terminal(s)' allocated diversity tiles among the diversity tiles included in the diversity subbands.

A description will now be made of a method and apparatus for configuring diversity tiles and localized tiles and transmitting/receiving data over the configured tiles according to a second embodiment of the present invention.

Before a description of the second embodiment of the present invention is given, the structure of diversity tiles and localized tiles described in the first embodiment of the present invention will be described again with reference to FIGS. 8A and 8B.

FIGS. 8A and 8B shows another method for configuring diversity tiles and localized tiles according to the first embodiment of the present invention.

Unlike the first embodiment, the threshold is assumed to be 50% of the total number of tiles and 8 tiles are included in one subband in FIGS. 8A and 8B.

The system shown in FIG. 2 determines the number of diversity tiles and the number of localized tiles at particular intervals through a specific resource allocation procedure, and signals the determined number of diversity tiles and the determined number of localized tiles to terminals over a specific control channel. In multiplexing the diversity tiles and the localized tiles, if the number of diversity tiles is not greater than a particular threshold, the system uniformly distributes the diversity tiles over the entire system band, and disposes the localized tiles in the remaining positions.

FIG. 8A shows a way of multiplexing diversity tiles and localized tiles for the threshold=50%. When the number of diversity tiles is greater than a particular threshold, the diversity tiles and the localized tiles are configured in different subbands. Subband, as used herein, refers to an arbitrary band previously agreed upon between the base station and the terminal. Commonly, the entire band is composed of multiple subbands, and one subband includes multiple tiles. FIGS. 8A and 8B, unlike FIG. 3, show the structure where 8 tiles are included in one subband. In the following description, the so-called 'zone' concept unused in the first embodiment will be introduced. That is, in FIGS. 8A and 8B, the zone where diversity tiles are disposed are referred to herein as a diversity zone, and the zone where localized tiles are disposed are referred to herein as a localized zone. The subband described below will be assumed to include 8 tiles.

Figure 9A:
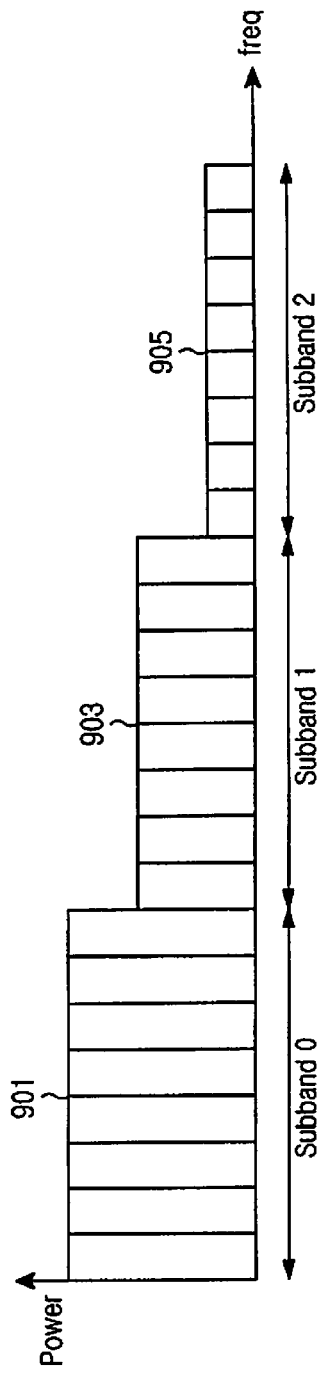
FIGS. 9A and 9B illustrate a frequency reuse technology example used in the OFDMA system.
Figure 9B:
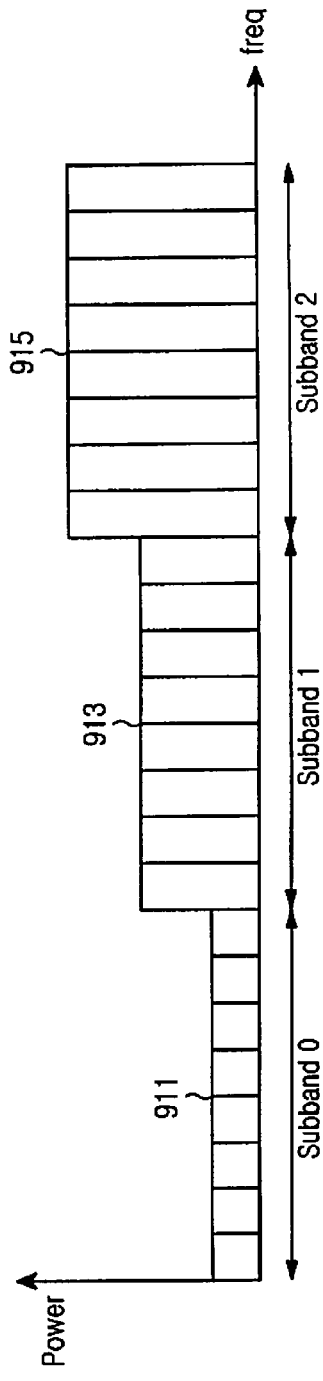

A common Orthogonal Frequency Division Multiple Access (OFDMA) system employs a frequency reuse technology. FIGS. 9A and 9B illustrate an exemplary frequency reuse technology used in the OFDMA system. Specifically, FIG. 9A illustrates subband-based transmission power distribution of a base station A, and FIG. 9B illustrates subband-based transmission power distribution of a base station B.

In FIGS. 9A and 9B, the horizontal axis means the frequency domain, and the vertical axis means the power domain. In the example of FIG. 9A, the base station A uses high power in a subband #0 901, mid-power in a subband #1 903, and low power in a subband #2 905. In the example of FIG. 9B, an adjacent base station B uses low power in a subband #0 911, mid-power in a subband #1 913, and high power in a subband #2 915. The subband in which the base station allocates different transmission power on a subband-by-subband basis for the frequency reuse technology is referred to herein as a frequency reuse subband.

If a terminal receiving data from the base station A is assumed to be located in the boundary between the two base stations A and B in FIGS. 9A and 9B, from the standpoint of the terminal receiving data from the base station A, the subband 0 is very higher in Signal-to-Interference plus Noise Ratio (SINR) than the subband 1 or subband 2, and the subband 2 is very lower in SINR than the subband 0 or subband 1. On the contrary, from the standpoint of the terminal that receives data from the base station B and is located in the boundary between the two base stations A and B, the subband 0 is very lower in SINR than the subband 1 or subband 2, and the subband 2 is very higher in SINR than the subband 0 or subband 1.

The frequency reuse technology is used for improving reception performance of the terminals located in the cell boundary by increasing an SINR for a particular band for the low-SINR terminals located in the cell boundary and transmitting data over the high-SINR subband, using the foregoing characteristics.

The technology of multiplexing the diversity tiles and the localized tiles in the frequency domain in the OFDMA system as described in the first embodiment is a technology used for obtaining gain of frequency-selective resource allocation (or selecting a band having a good wireless environment channel and allocating resources thereof) by dividing a frequency band into several bands in the frequency domain, allocating some bands to the diversity tiles to use them for the data transmission needing a frequency diversity effect, and allocating other some bands to the localized tiles. As described above, the frequency reuse technology is a technology of dividing a frequency band into multiple frequency reuse subbands, allocating high transmission power to some frequency reuse subbands, allocating low transmission power to other some frequency reuse subbands, and coordinating the transmission power allocation between adjacent base stations to obtain an effect thereof.

However, in order to simultaneously support the technology of multiplexing the diversity tiles and the localized tiles in the OFDMA system as in the first embodiment, and the frequency reuse technology, the frequency band is necessarily divided into several subbands and the subbands are managed, and the operation of dividing the frequency band several times for different purposes may prevent the efficient design and decrease the frequency efficiency.

Therefore, the second embodiment of the present invention, described below, provides a method and apparatus for configuring and managing frequency reuse subbands to support both the technology of multiplexing the diversity tiles and the localized tiles, and the frequency reuse technology in the OFDM system.

Before a description of the second embodiment of the present invention is given, a definition of the terms used herein will be made below.

Subzone, as used herein, refers to a unit zone by which the OFDMA system frequency-divides a frequency reuse subband to apply the frequency reuse technology. That is, the second embodiment of the present invention configures one frequency reuse subband by binding one or multiple subzones.

In other words, the localized subzone is a unit of frequency reuse for the localized subbands.

The subband is the unit band by which a terminal feeds back Channel Quality Information (CQI) of a forward channel to the base station. That is, the terminal can previously make an agreement with the base station, measure channel quality on a subband-by-subband basis according to the previous agreement, and feed back the measured channel quality information to the base station. Alternatively, the terminal can bind multiple adjacent subbands, and feed back the channel quality measured for the bound multiple subbands to the base station as channel quality information. The terminal is assumed to measure the channel quality on a subband-by-subband basis and feed back the result to the base station.

Figure 10:
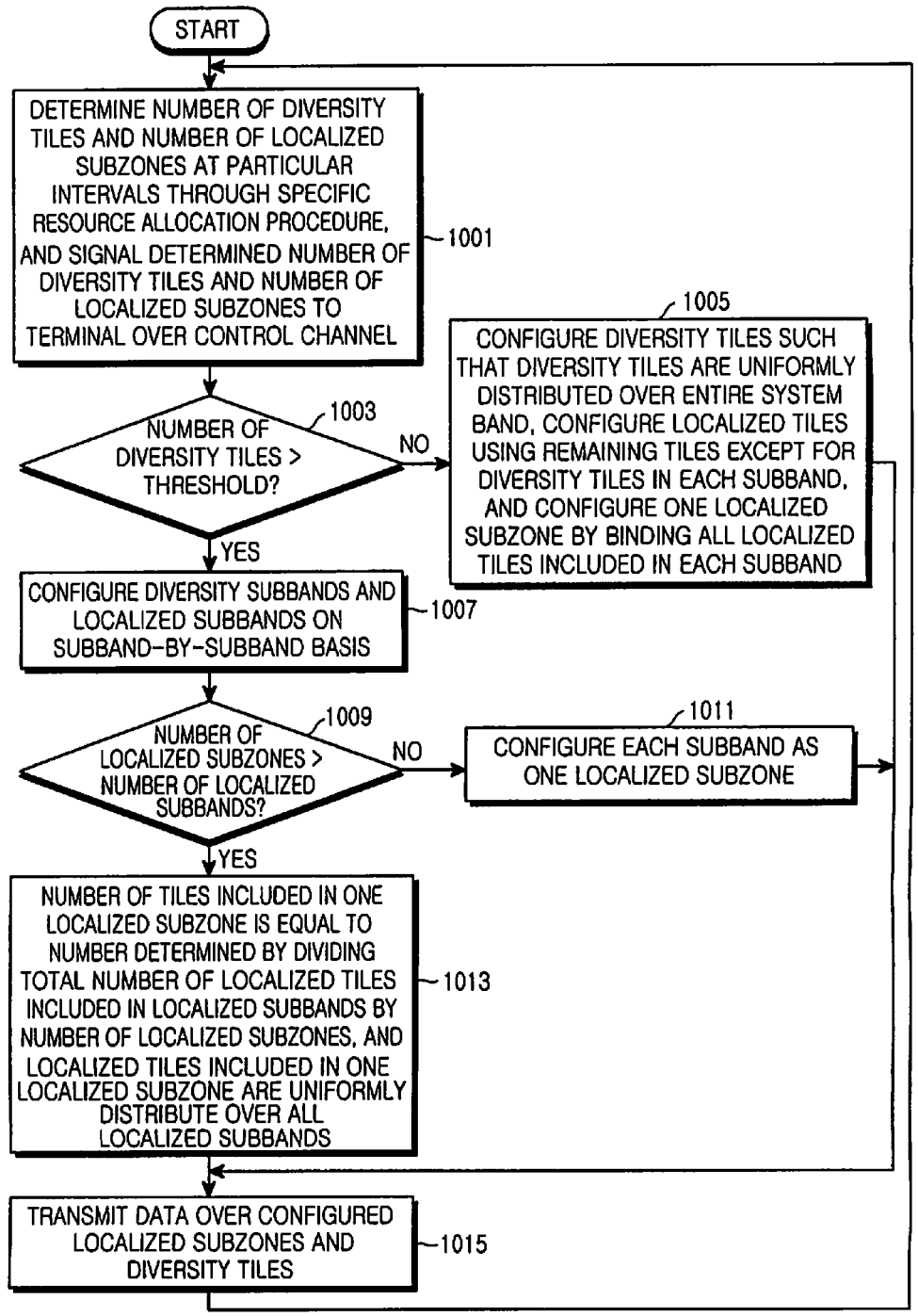
FIG. 10 illustrates a method for configuring localized subzones in a base station of an OFDMA system according to a second embodiment of the present invention.

FIG. 10 illustrates a method for configuring localized subzones in a base station of an OFDMA system according to the second embodiment of the present invention.

Referring to FIG. 10, a base station determines in step 1001 the number of diversity tiles and the number of localized subzones at particular intervals through a specific resource allocation procedure, and signals the determined number of diversity tiles and the determined number of localized subzones to a terminal over a control channel. The second embodiment of the present invention is characterized in that the method of configuring localized subzones differs according to the determined number of diversity tiles and the determined number of localized subzones. The structure of the determined localized subzones is maintained until step 1001 is re-performed. The base station determines in step 1003 whether the number of diversity tiles, determined in step 1001, is greater than a particular threshold.

If the number of diversity tiles is determined to be not greater than the threshold in step 1003, the base station configures in step 1005 diversity tiles in the entire system band so that the diversity tiles are uniformly distributed over the entire system band. Further, the base station configures localized tiles using the tiles left after allocating the diversity tiles in each subband, and configures one localized subzone by binding all localized tiles included in each subband.

After configuring the diversity tiles and the localized subzones in steps 1005, 1011 and 1013, the base station proceeds to step 1015 where the base station transmits data over the diversity tiles and localized subzones configured in steps 1005, 1011 and 1013.

Figure 11:
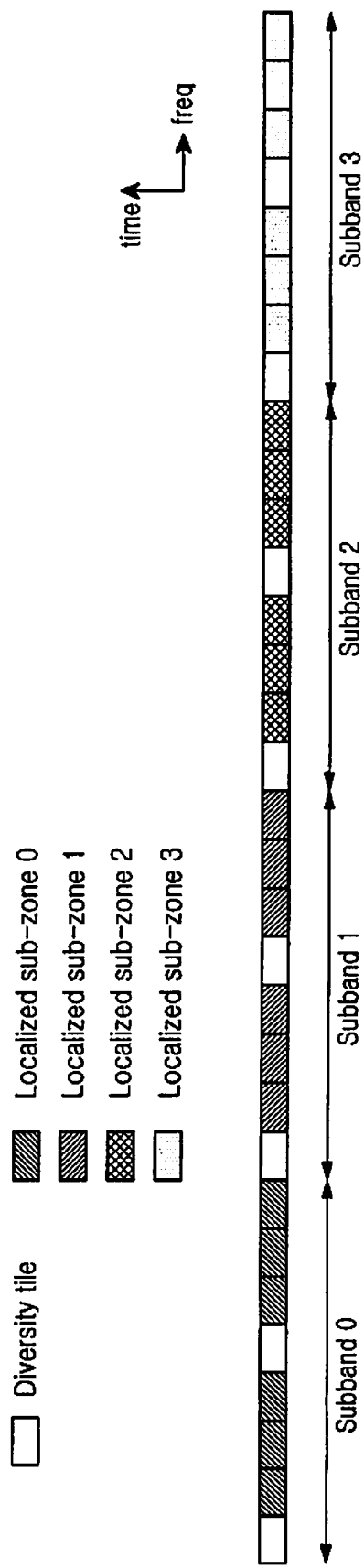
FIG. 11 illustrates a first example of configuring localized subzones according to the second embodiment of the present invention.

FIG. 11 illustrates a first example of configuring localized subzones according to the second embodiment of the present invention, and this is an example of step 1005 of FIG. 10. FIG. 11 presents a method for configuring localized subzones to apply the frequency reuse technology for a diversity zone configured as shown in FIG. 8A, according to the second embodiment of the present invention.

In FIG. 11, one rectangle indicates one tile. The blanked rectangles are diversity tiles as in FIGS. 8A and 8B, and the hatched tiles are localized tiles. In the second embodiment of the present invention, when the base station configures localized subzones as shown in FIG. 11, the base station can configure one localized subzone by binding the remaining localized tiles except for the diversity tiles among the tiles included in one subband. The reason for configuring localized subzones in this manner is to facilitate frequency-selective resource allocation for the localized tiles. That is, because the terminal transmits channel quality information to the base station on a subband-by-subband basis as described above, the terminal can maximize gain of the frequency-selective resource allocation by configuring one localized subzone using the remaining tiles except for the diversity tiles in one subband.

Figure 12:
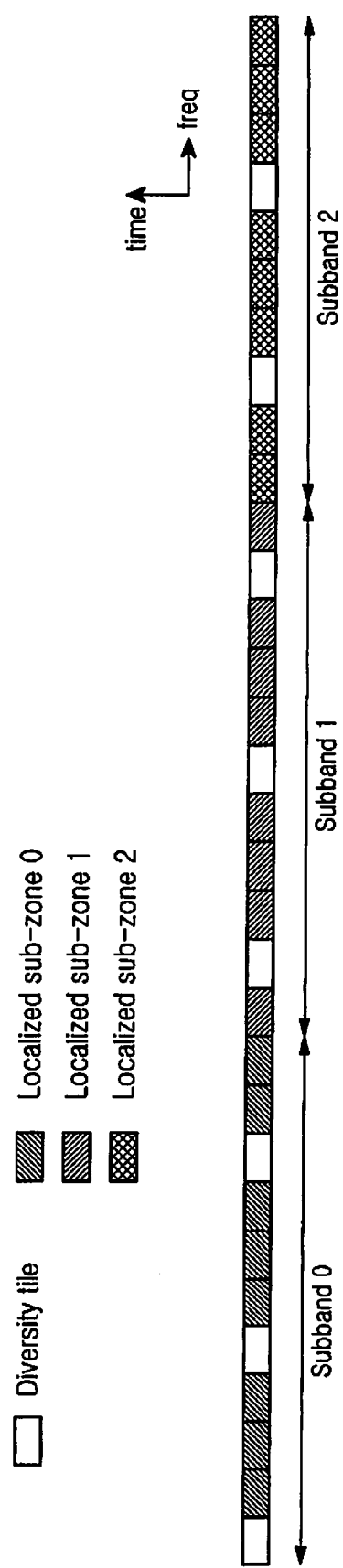
FIG. 12 illustrates a second example of configuring localized subzones according to the second embodiment of the present invention.

FIG. 12 shows a second example of configuring localized subzones according to the second embodiment of the present invention, and this is another example of step 1005 of FIG. 10.

Shown in FIG. 12 is another example of a method for configuring localized subzones to apply the frequency reuse technology for the diversity zone configured as shown in FIG. 8A, according to the second embodiment of the present invention. In FIG. 12, one rectangle indicates one tile. The blanked rectangles are diversity tiles as in FIGS. 8A and 8B, and the hatched tiles are localized tiles. When the base station configures localized subzones as shown in FIG. 12, the base station can configure one localized subzone by extending a size of the subband to the value corresponding to the number of diversity tiles included in one subband and binding the remaining localized tiles except for the diversity tiles in the extended subband.

Therefore, in FIG. 12, when the terminal feeds back subband-based channel quality information to the base station, the terminal measures channel quality for the subband, the number of whose tiles has increased by 3 compared to FIG. 11, and feeds back the measured channel quality information to the base station. This feedback transmission method should be previously agreed upon between the base station and the terminal for the following reason. That is, because the terminal feeds back the channel quality information on a subband-by-subband basis, the gain of the channel-selective resource allocation decreases when the change in size of the subband is not previously agreed upon between the base station and the terminal.

However, if the number of diversity tiles is determined to be greater than the threshold in step 1003, the base station proceeds to step 1007 where the base station configures diversity bands and localized bands on a subband-by-subband basis. That is, the diversity band and the localized band are configured as shown in FIG. 8B. In the structure of the diversity band and the localized band, the method of configuring localized subzones differs according to the number of localized subbands and the number of localized subzones, determined in step 1001. The number of localized subzones is the information previously known between the terminal and the base station through a specific signaling procedure.

The base station determines in step 1009 whether the number of localized subzones, determined in step 1001, is greater than the previously known number of localized subbands. If the number of localized subzones is determined to be not greater than the number of localized subbands, the base station proceeds to step 1011 where the base station configures each subband as one localized subzone.

Figure 13:
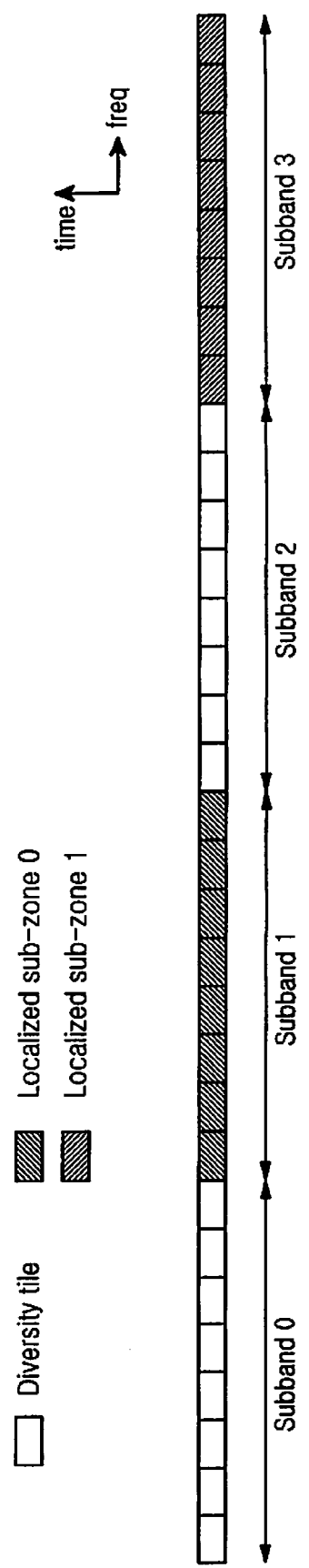
FIG. 13 illustrates a third example of configuring localized subzones according to the second embodiment of the present invention.

FIG. 13 shows a third example of configuring localized subzones according to the second embodiment of the present invention, and this is an example of step 1011 of FIG. 10.

Assuming in FIG. 13 that the number of localized subbands is 2 (subband #1 and subband #3) and the number of localized subzones, determined in step 1001 of FIG. 10, is also 2, one localized subband forms one localized subzone as shown in FIG. 13. That is, in FIG. 13, subband #1 is localized subzone #0, and subband #3 is localized subzone #1.

However, if the number of localized subzones, determined in step 1001, is determined to be greater than the number of localized subbands in step 1009, the base station proceeds to step 1013 where the number of tiles included in one localized subzone is equal to the number determined by dividing the total number of localized tiles by the number of localized subzones, and the localized tiles included in one localized subzone are uniformly distribute over all localized subbands.

Figure 14:
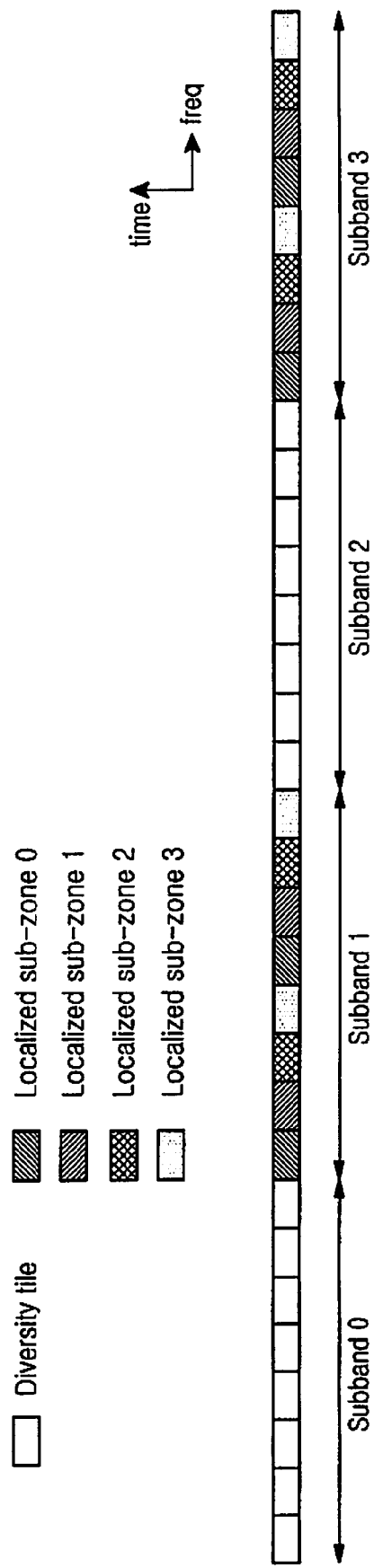
FIG. 14 illustrates a fourth example of configuring diversity subzones according to the second embodiment of the present invention.

FIG. 14 shows a fourth example of configuring diversity subzones according to the second embodiment of the present invention, and this is an example of step 1013 of FIG. 10.

It is assumed in FIG. 14 that the number of localized subbands is 2 (subband #1 and subband #3), and the number of localized subzones is 4. The number of tiles included in the two localized subbands is 16 (=8×2), and because the value determined by dividing the number 16 of tiles by the number 4 of localized subzones is 4, the number of tiles included in each localized subzone is 4.

Although the forgoing description has been made for examples where the number of localized tiles included in the localized subbands can be accurately divided by the number of localized subzones, arbitrary non-uniform division can be applied when the number of localized tiles included in the localized subband cannot be accurately divided by the number of localized subzones. That is, in the foregoing examples, the numbers of tiles included in localized subzone #0 to localized subzone #3 are 4, 4, 4 and 4, respectively. However, when the number of tiles included in two localized subbands is 15, the value determined by dividing the number 15 by the number 4 of localized subzones is 3.75, which is not an integer. In this case, the numbers of tiles included in localized subzones #0 to # 4 are set as equal as possible such that they are 3, 4, 4 and 4, or 4, 3, 4 and 4, respectively, and the number of tiles included in one or two arbitrary localized subzones can be set lower. It can be appreciated from FIG. 14 that 4 localized subzones are uniformly distributed over subband #1 and subband #3, which are localized subbands.

Figure 15:
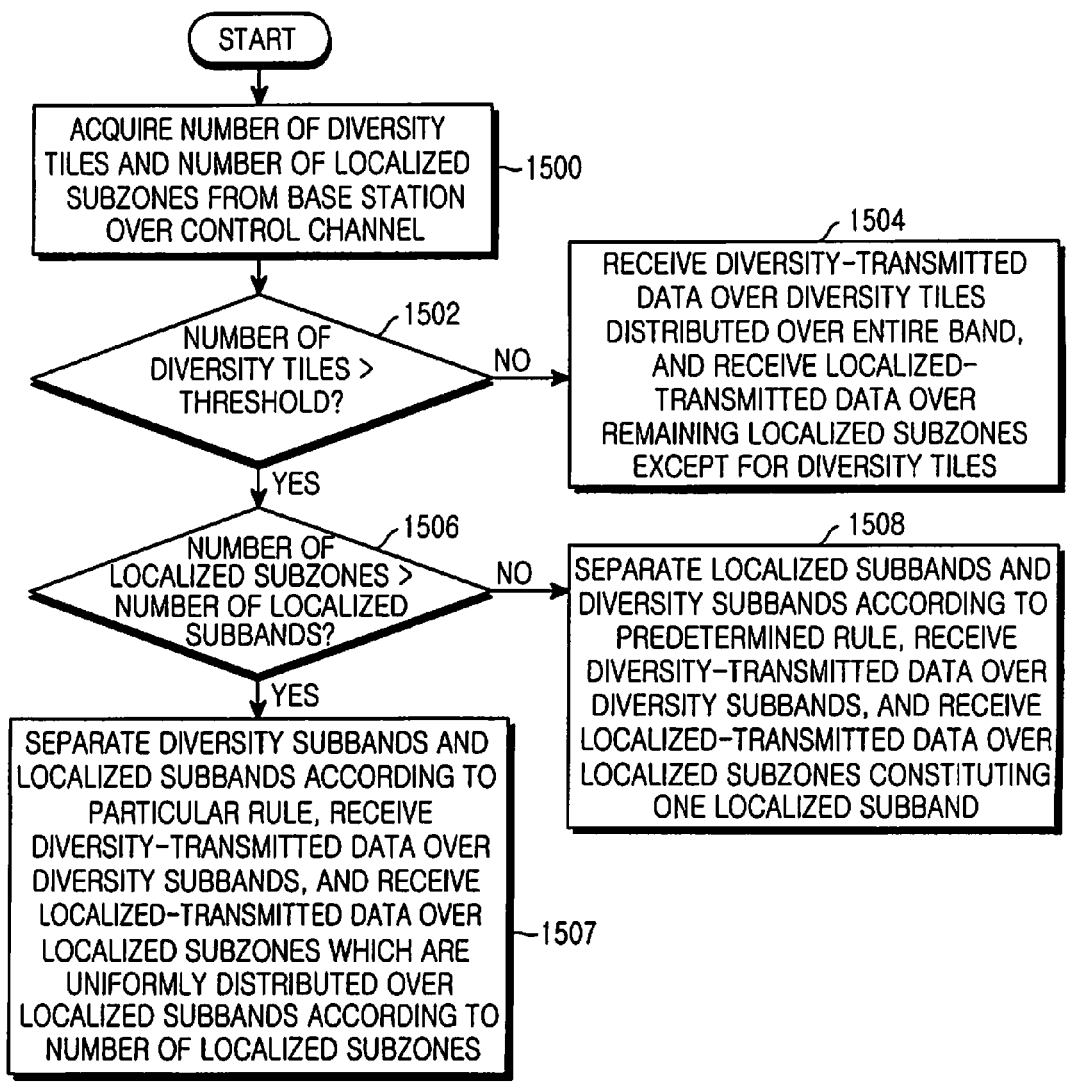
FIG. 15 illustrates a method for receiving data by a receiver over diversity tiles and Localized subzones according to the second embodiment of the present invention.

FIG. 15 shows a method for receiving data by a receiver over diversity tiles and localized subzones according to the second embodiment of the present invention.

Referring to FIG. 15, in step 1500, a receiver acquires the number of diversity tiles and the number of localized subzones from a base station over a specific control channel.

The receiver determines in step 1502 whether the number of diversity tiles is greater than a particular threshold. If the number of diversity tiles is determined to be not greater than the threshold, the receiver proceeds to step 1504 where the receiver receives diversity-transmitted data over the diversity tiles distributed over the entire band, and receives localized-transmitted data over the remaining localized subzones except for the diversity tiles.

However, if the number of diversity tiles is determined to be greater than the threshold in step 1502, the receiver determines in step 1506 whether the number of localized subzones, acquired in step 1500, is greater than the number of localized subbands. If the number of localized subzones is determined to be not greater than the number of localized subbands in step 1506, the receiver proceeds to step 1508 where the receiver separates the localized subbands and the diversity subbands according to a particular rule, receives diversity-transmitted data over the diversity subbands, and receives localized-transmitted data over the localized subzones constituting one localized subband.

However, if the number of localized subzones is determined to be greater than the number of localized subbands in step 1506, the receiver proceeds to step 1507 where the receiver separates the diversity subbands and the localized subbands according to a particular rule, receives diversity-transmitted data over the diversity subbands, and receives localized-transmitted data over the localized subzones which are uniformly distributed over the localized subbands according to the number of localized subzones.

Figure 16:
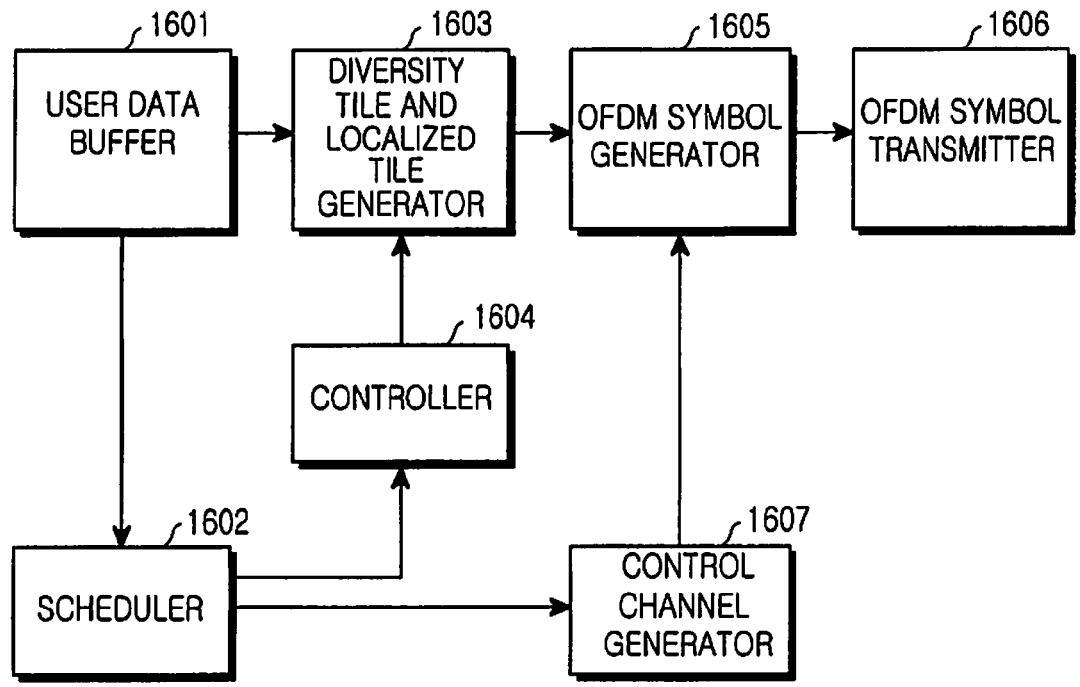
FIG. 16 is a transmitter of a base station for configuring tiles and transmitting data over the configured tiles according to an embodiment of the present invention.

FIG. 16 transmitter of a base station for configuring tiles and transmitting data over the configured tiles according to the present invention. Referring to FIG. 16, a user data buffer 1601 is a device for storing data for multiple users (or data to be transmitted to a receiver). A scheduler 1602 checks a state of the user data buffer 1601, and determines the number of diversity tiles and the number of localized tiles depending on the information necessary for scheduling according to the first embodiment of the present invention, or determines the number of diversity tiles and the number of localized subzones according to the second embodiment. The scheduler 1602, if the user data buffer 1601 has data to transmit to the receiver, provides a controller 1604 with the information indicating the presence of data to be transmitted to the receiver, through scheduling.

A control channel generator 1607 encodes the information (i.e. information on the number of diversity tiles and the number of localized tiles in the first embodiment, and information on the number of diversity tiles and the number of localized subzones in the second embodiment) according to a particular procedure.

The controller 1604 controls a diversity tile and localized tile generator 1603 depending on the number of diversity tiles or the number of localized tiles, received from the scheduler 1602, according to the first embodiment of the present invention, so as to perform localized transmission with the localized tiles and perform diversity transmission with the diversity tiles.

That is, according to the first embodiment of the present invention, if the number of diversity tiles, determined by the scheduler 1602, is greater than a particular threshold, the controller 1604 controls the diversity tile and localized tile generator 1603 to configure subbands including only diversity tiles and subbands including only localized tiles on a subband-by-subband basis, and the diversity tile and localized tile generator 1603 uniformly distributes the configured subbands over the entire band. That is, the controller 1604 according to the first embodiment of the present invention compares the number of diversity tiles, determined by the scheduler 1602, with a particular threshold, and controls the diversity tile and localized tile generator 1603 to configure tiles as shown in FIGS. 2 to 6 according to the comparison result, and to transmit data over the configured tiles.

In addition, if the tiles are configured under the control of the controller 1604 according to the first embodiment of the present invention, the diversity tile and localized tile generator 1603 performs cyclic shift as shown in FIGS. 4 to 6.

The controller 1604 according to the second embodiment of the present invention controls the diversity tile and localized tile generator 1603 depending on the number of diversity tiles and the number of localized subzones, received from the scheduler 1602, so as to perform localized transmission with the localized tiles and perform diversity transmission with the diversity tiles.

That is, according to the second embodiment of the present invention, the controller 1604 compares the number of diversity tiles, determined by the scheduler 1602, with a particular threshold, and controls the diversity tile and localized tile generator 1603 to configure the diversity tiles and localized subzones as shown in FIGS. 10 to 14 according to the comparison result, and to transmit data over the configured diversity tiles and localized tiles constituting localized subzones.

The user data is transmitted over the configured diversity tiles and localized tiles. That is, the tiles configured by the diversity tile and localized tile generator 1603 are input to an OFDM symbol generator 1605. The OFDM symbol generator 1605 configures OFDM symbols using the input tiles, and outputs the configured OFDM symbols to an OFDM symbol transmitter 1606. The OFDM symbol transmitter 1606 transmits the OFDM symbols to a receiver.

The diversity tile and localized tile generator 1603, the OFDM symbol generator 1605 and the OFDM symbol transmitter 1606 in the transmitter constitute a transmission module.

Figure 17:
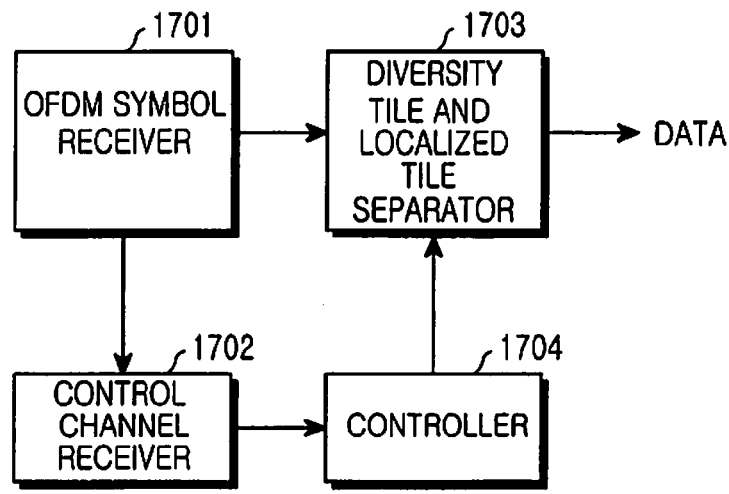
FIG. 17 is a receiver of a terminal for receiving data according to an embodiment of the present invention.

FIG. 17 shows a receiver of a terminal for receiving data according to the present invention.

Referring to FIG. 17, an OFDM symbol receiver 1701 receives an OFDM signal transmitted from a transmitter. A control channel receiver 1702 acquires control information over a control channel by a particular procedure. The control channel receiver 1702 receives control information for the number of diversity tiles and the number of localized tiles according to the first embodiment, and receives control information for the number of diversity tiles and the number of localized subzones according to the second embodiment. The control channel receiver 1702 is a block for performing an inverse operation of the control channel generator 1607 of FIG. 16.

A controller 1704 receives information on the number of diversity tiles and the number of localized tiles from the control channel receiver 1702 according to the first embodiment of the present invention, or receives information on the number of diversity tiles and the number of localized subzones according to the second embodiment of the present invention, and controls a diversity tile and localized tile separator 1703 to separate the diversity tiles and the localized tiles, or separate the diversity tiles and the localized subzones. The diversity tile and localized tile separator 1703 demodulates data received over the tiles allocated to the receiver among the tiles. That is, if the number of diversity tiles, acquired by the control channel receiver 1702, is greater than a particular threshold, the controller 1704 according to the first embodiment of the present invention controls the diversity tile and localized tile separator 1703 to separate the diversity subbands and the localized subbands so as to separate the diversity tiles and the localized tiles included in the subbands. However, if the number of diversity tiles is not greater than the threshold, the controller 1704 according to the first embodiment of the present invention controls the diversity tile and localized tile separator 1703 to separate the diversity tiles uniformly distributed over the entire band and the remaining localized tiles except for the diversity tiles.

In addition, if the number of diversity tiles, acquired by the control channel receiver 1702, is not greater than a particular threshold, the controller 1704 according to the second embodiment of the present invention controls the diversity tile and localized tile separator 1703 to separate the diversity tiles uniformly distributed over the entire band and the remaining localized subzones except for the diversity tiles because the tile structure in the entire system band is as shown in FIG. 11 or 12. However, if the number of diversity tiles is greater than the threshold, the controller 1704 according to the second embodiment controls the diversity tile and localized tile separator 1703 to separate the diversity subbands and the localized subbands and separate localized subzones constituting the localized subbands because the structure of the tiles is as shown in FIG. 13 or 14.

As described above, according to the first and second embodiments of the present invention, the diversity tile and localized tile separator 1703, under the control of the controller 1704, separates the diversity tiles and the localized tiles in the entire system band, and demodulates the data received over the allocated tiles.

As is apparent from the foregoing description, with the use of the technology of multiplexing the diversity tile and the localized tiles and cyclic-shifting their positions according to the embodiments of the present invention, it is possible to enable efficient data transmission and efficiently allocate localized subzones for the localized subzones in a mobile communication system where terminals using different transmission technologies coexist, thereby contributing to an increase in frequency efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting data in an Orthogonal Frequency Division Multiple Access (OFDMA) system, the method comprising:
    determining a number of diversity tiles, each of which includes physically separated frequency resources;
    uniformly disposing diversity subbands having the diversity tiles and localized subbands having localized tiles, each of which includes physically adjacent frequency resources, in an entire system band, when the determined number of diversity tiles is greater than a threshold;
    uniformly distributing the diversity tiles over the entire system band, and disposing the localized tiles in the remaining bands except for the diversity tiles, when the determined number of diversity tiles is not greater than the threshold; and
    transmitting data to multiple terminals over the configured diversity tiles and localized tiles using diversity transmission and localized transmission schemes.

2. The method of claim 1, wherein the configured diversity and localized subbands undergo cyclic shift on a subband-by-subband basis.

3. The method of claim 2, wherein the configured diversity and localized tiles undergo cyclic shift on a tile-by-tile basis.

4. The method of claim 3, wherein the configured diversity and localized subbands, when a Hybrid Automatic Repeat reQuest (HARQ) process is supportable, undergo cyclic shift in units of subbands corresponding to an identical HARQ interlace index where one HARQ process is performed.

5. The method of claim 1, further comprising:
    signaling the number of diversity tiles and the number of localized tiles.

6. The method of claim 1, further comprising:
    determining whether a number of localized subzones, each of which is a unit of frequency reuse for the localized subbands, is greater than a number of localized subbands, when the determined number of diversity tiles is greater than the threshold; and
    uniformly distributing localized tiles included in each of the localized subzones over the localized subbands when the number of localized subzones is greater than the number of localized subbands;
    wherein a number of tiles included in each of the localized subzones is set to a value determined by dividing a total number of tiles included in the localized subbands by the number of localized subzones.

7. The method of claim 6, further comprising:
    configuring a subzone indicative of a unit of frequency reuse by binding localized tiles included in each localized subband when the number of diversity tiles is not greater than the threshold.

8. The method of claim 6, further comprising:
    configuring localized tiles such that each of the localized subbands is one localized subzone when the number of localized subzones is not greater than the number of localized subbands.

9. The method of claim 6, further comprising:
    signaling the number of diversity tiles and the number of localized subzones.

10. A method for receiving data by a terminal in an Orthogonal Frequency Division Multiple Access (OFDMA) system, the method comprising:
    acquiring a number of diversity tiles, each of which includes physically separated frequency resources, over a specific control channel;
    determining whether the acquired number of diversity tiles is greater than a threshold;
    uniformly disposing diversity subbands having the diversity tiles and localized subbands having localized tiles, each of which includes physically adjacent frequency resources, in an entire system band, when the acquired number of diversity tiles is greater than the threshold;
    dividing the entire system band into diversity tiles uniformly distributed over the entire system band and localized tiles disposed in the remaining bands except for the diversity tiles, when the acquired number of diversity tiles is not greater than the threshold; and
    receiving data over allocated tiles among the diversity tiles and the localized tiles.

11. The method of claim 10, wherein the configured diversity and localized subbands undergo cyclic shift on a subband-by-subband basis.

12. The method of claim 11, wherein the configured diversity and localized tiles undergo cyclic shift on a tile-by-tile basis.

13. The method of claim 12, wherein the configured diversity and localized subbands, when a Hybrid Automatic Repeat reQuest (HARQ) process is supportable, undergo cyclic shift in units of subbands corresponding to an identical HARQ interlace index where one HARQ process is performed.

14. The method of claim 10, wherein the localized subbands each include one localized subzone when the number of diversity tiles is greater than the threshold and the number of localized subbands is not greater than the number of localized subzones, each of which is a unit of frequency reuse for the localized subbands.

15. The method of claim 10, wherein the localized tiles included in each of the localized subzones are uniformly distributed over the localized subbands, and a number of tiles included in each of the localized subzones is set to a value determined by dividing a total number of tiles included in the localized subbands by the number of localized subzones, when the number of diversity tiles is greater than the threshold and the number of localized subzones is greater than the number of localized subbands.

16. A transmission apparatus of a base station for transmitting data in an Orthogonal Frequency Division Multiple Access (OFDMA) system, the apparatus comprising:
- a scheduler for determining a number of diversity tiles, each of which includes physically separated frequency resources to be used in an entire system band;
- a controller for comparing the determined number of diversity tiles with a threshold, uniformly disposing diversity subbands having the diversity tiles and localized subbands having localized tiles, each of which includes physically adjacent frequency resources, in the entire system band when the number of diversity tiles is greater than the threshold, and uniformly distributing the diversity tiles over the entire system band, and disposing the localized tiles in the remaining bands except for the diversity tiles, when the number of diversity tiles is not greater than the threshold; and
- a transmission module for transmitting data to multiple terminals over the diversity tiles and localized tiles configured under control of the controller.

17. The transmission apparatus of claim 16, wherein configured diversity and localized subbands undergo cyclic shift on a subband-by-subband basis.

18. The transmission apparatus of claim 17, wherein the configured diversity and localized tiles undergo cyclic shift on a tile-by-tile basis.

19. The transmission apparatus of claim 18, wherein the configured diversity and localized subbands, when a Hybrid Automatic Repeat reQuest (HARQ) process is supportable, undergo cyclic shift in units of subbands corresponding to an identical HARQ interlace index where one HARQ process is performed.

20. The transmission apparatus of claim 16, wherein the controller determines whether a number of localized subzones, each of which is a unit of frequency reuse for the localized subbands, is greater than a number of localized subbands, when the determined number of diversity tiles is greater than the threshold, and controls the transmission module to uniformly distribute localized tiles included in each of the localized subzones over the localized subbands when the number of localized subzones is greater than the number of localized subbands;

wherein a number of tiles included in each of the localized subzones is set to a value determined by dividing a total number of tiles included in the localized subbands by the number of localized subzones.

21. The transmission apparatus of claim 20, wherein the controller controls the transmission module to configure a subzone indicative of a unit of frequency reuse by binding localized tiles included in each localized subband, when the number of diversity tiles is not greater than the threshold.

22. The transmission apparatus of claim 20, wherein the controller controls the transmission module to configure localized tiles so each of the localized subbands is one localized subzone, when the number of localized subzones is not greater than the number of localized subbands.

23. A reception apparatus for receiving data in an Orthogonal Frequency Division Multiple Access (OFDMA) system, the apparatus comprising:
- a control channel receiver for acquiring a number of diversity tiles, each of which includes physically separated frequency resources, from a base station over a specific control channel;
- a controller for comparing the acquired number of diversity tiles with a threshold, uniformly disposing diversity subbands having the diversity tiles and localized subbands having localized tiles, each of which includes physically adjacent frequency resources, in an entire system band, when the number of diversity tiles is greater than the threshold, and dividing the entire system band into diversity tiles uniformly distributed over the entire system band and localized tiles disposed in remaining bands except for the diversity tiles when a number of diversity tiles is not greater than the threshold; and
- a reception module for receiving data over allocated tiles among the diversity tiles and the localized tiles configured under control of the controller.

24. The reception apparatus of claim 23, wherein the localized subbands each include one localized subzone when the number of diversity tiles is greater than the threshold and a number of localized subbands is not greater than a number of localized subzones, each of which is a unit of frequency reuse for the localized subbands.

25. The reception apparatus of claim 23, wherein the localized tiles included in each of the localized subzones are uniformly distributed over the localized subbands, and a number of tiles included in each of the localized subzones is set to a value determined by dividing a total number of tiles included in the localized subbands by a number of localized subzones, when the number of diversity tiles is greater than the threshold and the number of localized subzones is greater than a number of localized subbands.

* * * * *